Patented Nov. 24, 1953

2,660,522

UNITED STATES PATENT OFFICE 2,660,522

METHOD FOR THE MANUFACTURE OF PERMANENT MAGNETS

Charles Marquaire, La Tronche, France, assignor to Societe d'Electro-Chimie d'Electro-Metallurgie et des Acieries Electriques d'Ugine, Paris, France, a corporation of France No Drawing. Application May 18, 1951, Serial No. 227,091

2 Claims. (Cl. 75—0.5)

Various methods are known for the manufacture of permanet magnets from metallic powders.

More particularly, a method is known for the manufacture of permanent magnets through agglomeration by way of simple compression and magnetization of powders obtained through decomposition and possibly reduction under suitable conditions of compounds of ferro-magnetic metals or alloys, more particularly of formates, oxalates, carbonates or hydroxides.

Another method which is known for the manufacture of permanent magnets through agglomeration and magnetization of iron and cobalt oxide powders is the one of decomposition under suitable conditions of mixed crystals produced through the simultaneous precipitation of certain iron and cobalt salts.

It also has been suggested to make permanent magnets through agglomeration and magnetization of powders of iron and of a metallic oxide having a high formation heat, lime for example, obtained through decomposition under suitable conditions of mixed crystals produced through the simultaneous precipitation of a solution of compounds of the iron and of the metal which is to supply the oxide.

All powders obtained in that way possess the very remarkable property of offering an exceedingly high coercive force which is maintained after compression and owing to which the obtained magnets offer very high magnetic characteristics. These characteristics are particularly high for the lime-iron magnets.

The present invention has for its object to provide improvements in or relating to the above mentioned methods for the manufacture of permanent magnets and to the magnets themselves.

The invention relates to a method for the manufacture of permanent magnets of iron-tin, which fundamentally consists in supplying an aqueous solution of a ferrous salt and of a stannous salt, in precipitating from said solution by means of an alkaline bicarbonate or of an alkaline carbonate or of a mixture of both of iron and tin carbonates, in separating this precipitate, in decomposing it into oxides at a temperature lower than 450° C. and then in reducing preferably through hydrogen the oxides produced through said decomposition at a temperature lower than 450° C. and in agglomerating by any known means, the so obtained metallic powder at sufficiently low temperatures for preventing the magnetic properties to disappear.

The respective proportions of the ferrous and stannous compounds which are used are chosen in such a manner that the obtained final powder contains less than 20% of tin. However, it was determined that the so prepared iron-tin powders show particularly favourable magnetic properties when the tin content is comprised between 4 and 8% and are well suited for the manufacture of permanent magnets of high quality.

The following examples enable to describe more particularly the method which forms the subject-matter of the invention and to understand the latter better.

The first example relates to the preparation of powders containing a tin proportion comprised in the optimum zone and the subsequent manufacture of magnets through compression at different pressures.

Both other examples relate to the preparation of powders containing a lower tin percentage than 20% but which is substantially different in the optimum direction.

The three following practical examples of application of the method have given particularly efficacious and economical results.

Example 1

A solution of ferrous sulphate and of stannous chloride containing 90 grams of iron per litre and 5.5 grams of tin per litre and having a certain acidity near 3% of free sulphuric acid in order to avoid the hydrolysis of the stannous salt was poured into a vessel containing a saturated solution of sodium bicarbonate with solid sodium bicarbonate in suspension, the total quantity of the bicarbonate present being just that which makes it possible to obtain the quantitative precipitation of the carbonates.

The so obtained carbonate precipitate was washed under shelter from air with cold water saturated with carbonic gas and then dried also under shelter from air. It was then decomposed through heat at 350° C. under a partial vacuum in order to eliminate rapidly the developed carbonic gas.

The residue of this operation containing oxides was reduced through a current of pure and dry hydrogen at 350° C. during one and a half hour. The quantity of hydrogen was controlled in such a manner that 20 cubic metres passed per hour and per kilogram of reduced powder. The so obtained pyrophoric powder contained about 6% of tin; it was immersed in gasoline.

Samples of said powder were then taken and agglomerated in the cold under different pressures. The following graph indicates the magnetic characteristics which were found on each agglomerate.

| Pressure of agglomeration | Br | Hc | BrHc | BH max. |
|---|---|---|---|---|
| (1) 4 tons/cm.$^2$ | 5,500 | 620 | $3.4.10^6$ | $1.36.10^6$ |
| (2) 6 tons/cm.$^2$ | 6,200 | 580 | $3.6.10^6$ | $1.51.10^6$ |
| (3) 8 tons/cm.$^2$ | 7,200 | 500 | $3.6.10^6$ | $1.58.10^6$ |

*Example 2*

A solution of ferrous sulphate and stannous chloride containing 100 grams of iron per litre and 2 grams of tin per litre was treated as in Example 1.

A pyrophoric powder with about 2% of tin was thus obtained the magnetic characteristics of which under a pressure of agglomeration of 6 tons/cm.$^2$ were the following:

| Br | Hc | BrHc | BH max. |
|---|---|---|---|
| 6,100 | 510 | $3.1.10^6$ | $1.3.10^6$ |

*Example 3*

A solution of ferrous sulphate and stannous chloride containing 100 grams of iron per litre and 11 grams of tin per litre was treated as in Example 1. The so obtained pyrophoric powder contained about 10% of tin and showed the following magnetic characteristics corresponding to a pressure of agglomeration of 6 tons/cm.$^2$.

| Br | Hc | BrHc | BH max. |
|---|---|---|---|
| 6,500 | 500 | $3.2.10^6$ | $1.34.10^6$ |

What I claim is:

1. A method for the manufacture of permanent magnets formed of tin and iron, which comprises the steps of forming a mixed solution of a ferrous salt and a stannous salt, precipitating a mixture of iron and tin carbonates from said solution by means of a salt of the group consisting of the alkaline carbonates and bicarbonates, separating said mixture from the accompanying solution, decomposing said mixture into oxides through heating at a temperature lower than 450° C., reducing the oxides resulting from this decomposition at a temperature lower than 450° C., the respective proportions of ferrous and stannous salts in the initial solution being so chosen that the reduced final powder contains less than 20% of tin and agglomerating the so obtained metallic powder at a sufficiently low temperature for preventing the magnetic properties from disappearing.

2. A method for the manufacture of permanent magnets formed of tin and iron, which comprises the steps of forming a mixed solution of a ferrous salt and a stannous salt, precipitating a mixture of iron and tin carbonates from said solution by means of a salt of the group consisting of the alkaline carbonates and bicarbonates, separating said mixture from the accompanying solution, decomposing said mixture into oxides through heating at a temperature lower than 450° C., reducing the oxides resulting from this decomposition at a temperature lower than 450° C., the respective proportions of ferrous and stannous salts in the initial solution being so chosen that the reduced final powder contains between 4 and 8% of tin, and agglomerating the so obtained metallic powder at a sufficiently low temperature for preventing the magnetic properties from disappearing.

CHARLES MARQUAIRE.

References Cited in the file of this patent

UNITED STATES PATENTS

| Number | Name | Date |
|---|---|---|
| 2,254,976 | Powell | Sept. 2, 1941 |
| 2,339,137 | Berge | Jan. 11, 1944 |
| 2,497,268 | Neel | Feb. 14, 1950 |

FOREIGN PATENTS

| Number | Country | Date |
|---|---|---|
| 413,526 | Great Britain | July 19, 1934 |